United States Patent
Scanlon

(10) Patent No.: US 7,121,700 B1
(45) Date of Patent: Oct. 17, 2006

(54) VEHICLE ADVERTISING SIGN ILLUMINATION APPARATUS

(76) Inventor: Jarrod Scanlon, 335 Elmdale Rd., Scituate, RI (US) 02857

( * ) Notice: Subject to any disclaimer, the term of this patent is extended or adjusted under 35 U.S.C. 154(b) by 79 days.

(21) Appl. No.: 10/967,790

(22) Filed: Oct. 18, 2004

(51) Int. Cl.
*B60Q 1/26* (2006.01)

(52) U.S. Cl. ...................... 362/493; 362/183; 362/812; 40/591; 40/592

(58) Field of Classification Search ................ 362/545, 362/812, 183, 493; 40/572, 591, 592
See application file for complete search history.

(56) References Cited

U.S. PATENT DOCUMENTS

| | | |
|---|---|---|
| 2,559,163 A | 7/1951 | Macdonald |
| 3,153,294 A | 10/1964 | Hay et al. |
| 3,242,329 A | 3/1966 | Abrams |
| 3,274,548 A | 9/1966 | Brimsek |
| 3,305,961 A | 2/1967 | Lanzon et al. |
| 3,318,031 A | 5/1967 | Whaley et al. |
| 4,052,806 A | 10/1977 | George |
| 4,587,754 A | 5/1986 | Ossner |
| 4,667,428 A | 5/1987 | Elmer |
| 4,751,494 A * | 6/1988 | Crotwell ...................... 340/473 |
| 4,787,163 A | 11/1988 | Berg |
| 4,839,975 A | 6/1989 | Elmer |
| 5,636,462 A * | 6/1997 | Kleiman ...................... 40/452 |
| 5,918,397 A | 7/1999 | Elmer |
| 6,154,994 A * | 12/2000 | O'Brien et al. ................ 40/575 |
| 2003/0053308 A1* | 3/2003 | Cathel ......................... 362/154 |

* cited by examiner

*Primary Examiner*—Stephen F Husar
*Assistant Examiner*—Meghan K. Dunwiddle
(74) *Attorney, Agent, or Firm*—Michael I Kroll

(57) ABSTRACT

Apparatus for an illuminable member comprising a plurality of bulbs 14 mounted on a circuit board 12 in electrical communication with a power source having electrical leads 24 between the power source and recharging connector. The apparatus 10 can be positioned within a housing 26 having one or more transparencies forming an integral part therewith whereby light would be viewable from the exterior of the housing when the illuminable member 14 is energized. Preferably, Light Emitting Diodes (LEDs) 14 are mounted to the circuit board 12 in electrical communication with each other and the power source, which in the preferred embodiment is one or more batteries 20 forming an integral part of the illuminable member with corded and ported means provided for recharging the power source.

10 Claims, 8 Drawing Sheets

US 7,121,700 B1

VEHICLE ADVERTISING SIGN ILLUMINATION APPARATUS

BACKGROUND OF THE INVENTION

1. Field of the Invention

The present invention relates generally to signage and, more specifically, to means for illuminating signage. The present invention provides an illuminable member comprising a plurality of bulbs mounted on a circuit board in electrical communication with a power source having electrical leads between the power source and recharging connector. The present invention can be positioned within a housing having one or more transparencies forming an integral part therewith whereby light would be viewable from the exterior of said housing when said illuminable member is energized. Preferably, Light Emitting Diodes (LEDs) are mounted to the circuit board in electrical communication with each other and the power source, which in the preferred embodiment is one or more batteries, forming an integral part of said illuminable member with corded and ported means provided for recharging said power source.

2. Description of the Prior Art

There are other illumination device designed for signage. Typical of these is U.S. Pat. No. 2,559,163 issued to Macdonald on Jul. 3, 1951.

Another patent was issued to Hay et al on Oct. 20, 1964 as U.S. Pat. No. 3,153,294. Yet another U.S. Pat. No. 3,242,329 was issued to Abrams on Mar. 22, 1966 and still yet another was issued on Sep. 20, 1966 to Brimsek as U.S. Pat. No. 3,274,548.

Another patent was issued to Lanzon, et al on Feb. 28, 1967 as U.S. Pat. No. 3,305,961. Yet another U.S. Pat. No. 3,318,031 was issued to Whaley, et al. on May 9, 1967. Another was issued to George on Oct. 11, 1977 as U.S. Pat. No. 4,052,806 and still yet another was issued on May 13, 1986 to Ossner as U.S. Pat. No. 4,587,754.

Another patent was issued to Elmer on May 26, 1987 as U.S. Pat. No. 4,667,428. Yet another U.S. Pat. No. 4,787,163 was issued to Berg on Nov. 29, 1988. Another was issued to Elmer on Jun. 20, 1989 as U.S. Pat. No. 4,839,975 and still yet another was issued on Jul. 6, 1999 to Elmer as U.S. Pat. No. 5,918,397.

U.S. Pat. No. 2,559,163

Inventor: Wallace Macdonald

Issued: Jul. 3, 1951

In association with a vehicle including a roof, a signaling device comprising a housing mounted on said roof and including a pair of laterally spaced side members having openings therein, a set of colored lenses provided on the front and rear and inner and outer side surfaces covering the openings of each side member, the lenses on the two side members being of different colors, sets of lamps one set in each side member, and switch means for selectively energizing the sets of lamps.

U.S. Pat. No. 3,153,294

Inventor: Sam M. Hay, et al.

Issued: Oct. 20, 1964

Support means in combination with a surface to which said support means is to be attached, said support means comprising:

(a) a plurality of spaced apart, supporting standards which include a base portion having opposed, laterally extending arms;

(b) sheet-like members each located in a plane substantially parallel to said standards;

(c) means for fastening said sheet-like members to said standards comprising a retaining member extending laterally of said standards and being bifurcated to provide a pair of flexible arms having tapered ends defining oppositely disposed retaining detents spaced inwardly thereof and having inner and outer ends, said bifurcated arms being further arranged to protrude through an aperture of a respective sheet-like member, and a relatively rigid locking washer having at least a first and second face and having an aperture arranged to slidably receive said bifurcated arms when compressed towards one another as said sheet-like member and said washer are forced inwardly of said tapering ends, said washer means being retained in a locking position in said detent outwardly of said sheet-like member upon release of said flexible arms to normal positions so that said first face of said washer means is flush against said sheet-like member while said second face abuts the outer end of said detent.

U.S. Pat. No. 3,242,329

Inventor: Ralph Abrams

Issued: Mar. 22, 1966

An illuminated display device for a motor vehicle comprising a rectangular base, means for mounting said base on a motor vehicle, spaced sockets on said base for, receiving electrical bulbs, a pair of spaced conductor strips of stiff metal extending between said sockets to connect said sockets in electrical parallel, an electrical cord connection to said strips, and a translucent cover over said base, one of said strips extending between said sockets in spaced relation to said base, each end of said strip being bent into an inverted U-shape and extending over the edge of the adjacent socket whereby the free end of said strip makes electrical contact with the side of the bulb base mounted in each socket.

U.S. Pat. No. 3,274,548

Inventor: John W. Brimsek

Issued: Sep. 20, 1966

A device of the character described comprising, in combination, an electric light, a light mount supporting said electric light, an electric cord being electrically connected at one end to said electric light, an electric plug connected to the other end of the electric cord and being adapted for mounting in an automobile electric cigar lighter receptacle to energize said electric light, a base being removably attached to said light mount for supporting said light mount and the electric light, said base having an aperture for receiving said light and an elongated slot opening into said aperture, a magnet having a narrow neck being mounted in said slot and having one portion on one side of said base and the remainder on the other side of said base, a translucent message plate fixed to said base, and a second translucent message plate fixed to said base and being substantially opposite to the first-mentioned translucent message plate to have the electric light between said plates to illuminate the plates.

U.S. Pat. No. 3,305,961

Inventor: Amleto P. Lanzon, et al.

Issued: Feb. 27, 1967

A portable illuminated signal flag for motor vehicles comprising a housing, illuminating means attached to the housing, and means for mounting said housing onto the motor vehicle, said housing comprising a body portion and an end cover assembly, said body portion including an end wall, a top wall, a bottom wall, and a pair of side panels with at least one of said side panels being an indicia carrying translucent panel, said end cover assembly being attached to said body portion on the end of said body portion opposite from said end wall, said end wall and said end cover assembly being substantially vertical when said signal flag is in a position of use on said motor vehicle, said end cover assembly having a longitudinal dimension substantially greater than said end wall longitudinal dimension, said mounting means including a mounting bracket attached to said bottom wall of said body portion at spaced apart locations and magnetic means attached to said mounting bracket for detachably securing said housing to a motor vehicle, said mounting means including means to space said housing from said mounting bracket whereby said end wall and said end cover assembly are maintained in said vertical position on said motor vehicle giving a flag-like appearance to said housing.

U.S. Pat. No. 3,318,031

Inventor: William E. Whaley

Issued: May 9, 1967

An advertising sign adapted to be mounted on the roof of a motor vehicle having a battery comprising a holder for a card having advertising material thereon and including means for mounting the holder on the roof of the vehicle, a source of light, means carried by said source of light independent of and separable from said holder for supporting the source of light from said holder so that it lights up the advertising material on the card carried by the holder, and means carried by said holder for activating said source of light and adapted to be connected to the battery of the vehicle to be energized thereby.

U.S. Pat. No. 4,052,806

Inventor: James Rembrant George

Issued: Oct. 11, 1977

A display device for displaying information bearing material having a side portion for supporting the material for viewing by the general public. The device includes an illuminating means located behind the side portion so that the information bearing material can be illuminated from a direction opposite to that from which the material will be viewed by the public.

U.S. Pat. No. 4,587,754

Inventor: Martin W. G. Ossner

Issued: May 13, 1986

An illuminated display consists in a number of light box modules each having a casing and a light source within the casing for illuminating a transparency. Each module is adapted for mounting to a skeletal support frame in contiguous relationship with another. Preferably the module casing has sidewalls which on at least 3 sides include an inward step adapted to engage members of the frame.

U.S. Pat. No. 4,667,428

Inventor: William A. Elmer

Issued: May 26, 1987

An advertising sign holder for attachment to a vehicle roof is molded from a translucent plastic sheet. A triangular base flange has a hollow truncated pyramid with a triangular base integral therewith. The pyramid includes an integral top. Suction cups are attached to the corners of the base flange for the dual function of attaching the sign to a vehicle roof and maintaining separation of a plurality of signs nested together for storage. An electric light disposed within the pyramid portion provides illumination of the sign holder.

U.S. Pat. No. 4,787,163

Inventor: Marlin C. Berg

Issued: Nov. 29, 1988

A portable sign for removable mounting on the roof of a vehicle. The sign includes a rigid body formed of first, second and third side walls formed into a rigid triangular structure, a top structure including a triangular top wall and a frame fitting over the top wall and including a downturned flange extending around the laterally outer triangular perimeter of the top wall, and a bottom structure including a triangular bottom wall and a bottom frame including an upturned flange extending totally around the laterally outer perimeter of the bottom wall. The upper edge portion of the triangular body structure is positioned contiguously within and attached to the downturned flange of the top structure and the lower edge portion of the triangular body structure is positioned contiguously within and attached to the upturned flange of the bottom structure. An alarm assembly is also provided within the rigid body. The alarm assembly includes a first alarm circuit operative to sound an alarm in response to tilting movement of the sign out of a predetermined, prescribed angular position relative to the roof of the vehicle and a second alarm circuit operative to sound an alarm in response to disconnection of an electrical power supply to the sign.

U.S. Pat. No. 4,839,975

Inventor: William A. Elmer

Issued: Jun. 20, 1989

A lighting system for a translucent plastic car top sign having three side panels forming a truncated triangular pyramid and a top is disclosed. A convex reflector surface depends from the top and has three electric lamps oriented to be aligned with the apexes of the triangular pyramid such that each panel is illuminated by overlapping of direct and reflected light from the lamps. A translucent diffuser dome may be disposed over the reflector and lamps.

U.S. Pat. No. 5,918,397

Inventor: William A. Elmer

Issued: Jul. 6, 1999

An advertising display for use above the roof of a vehicle comprises a rigid elongated and enclosed advertising member, which is of substantially triangular cross section and which can be reversibly mounted on a metallic roof with the use of magnets affixed within receptacles in the base of the display. Apparatus is provided for storing a plurality of the advertising members in a space-conserving fashion.

While these illumination devices may be suitable for the purposes for which they were designed, they would not be as suitable for the purposes of the present invention, as hereinafter described.

SUMMARY OF THE PRESENT INVENTION

The present invention discloses an illuminable member comprising a plurality of bulbs mounted on a circuit board in electrical communication with a power source having electrical leads between the power source and recharging connector. The present invention can be positioned within a housing having one or more transparencies forming an integral part therewith whereby light would be viewable from the exterior of the housing when the illuminable member is energized. Preferably, Light Emitting Diodes (LEDs) are mounted to the circuit board in electrical communication with each other and the power source, which in the preferred embodiment is one or more batteries forming an integral part of the illuminable member with corded and ported means provided for recharging the power source.

A primary object of the present invention is to provide an illuminable device having bulbs in electrical communication with a power source and means for recharging said power source.

Another object of the present invention is to provide a circuit board having the bulbs mounted thereon.

Yet another object of the present invention is to fixedly attach the power source to said circuit board.

Still yet another object of the present invention is to provide a spaced apart connector in electrical communication with the power source providing means for selectively recharging said power source.

Another object of the present invention is to provide LEDs as the preferred light emitting bulbs of the illuminable device.

Yet another object of the present invention is to provide one or more rechargeable batteries as the preferred power source for said illuminable device.

Still yet another object of the present invention is to provide an illuminable device that can be fixedly positioned within an enclosure forming a housing for said illuminable member.

Another object of the present invention is to provide portable illuminable signage having a housing incorporating a port for charging an internal power source.

Yet another object of the present invention is to provide a device having a rechargeable power source with a plurality of LEDs mounted on a circuit board in electrical communication therewith, located within a housing having an exteriorly located receptacle for recharging said power source.

Still yet another object of the present invention is to provide illuminable signage having a housing comprising an enclosed structure with one or more transparent or semi-transparent elements therein.

Another object of the present invention is to provide external means for engaging and disengaging the illumination of the Light Emitting Diodes (LED).

Yet another object of the present invention is to provide an illuminable member wherein said power source is at least one rechargeable battery.

Still yet another object of the present invention is to provide an illuminable member having a recharging port in electrical communication with said battery for recharging said battery.

Another object of the present invention is to provide an illuminable signage wherein said recharging port forms an integral part of the housing wall.

Additional objects of the present invention will appear as the description proceeds.

The present invention overcomes the shortcomings of the prior art by providing an illuminable member comprising a plurality of bulbs mounted on a circuit board in electrical communication with a power source having electrical leads between the power source and recharging connector. The present invention can be placed within a housing having one or more transparencies forming an integral part therewith whereby light would be viewable from the exterior of said housing when said illuminable member is positioned therein and energized. Preferably, Light Emitting Diodes (LEDs) are mounted to the circuit board in electrical communication with each other and the power source, which in the preferred embodiment is one or more batteries, forming an integral part of said illuminable member with corded and ported means provided for recharging said power source.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
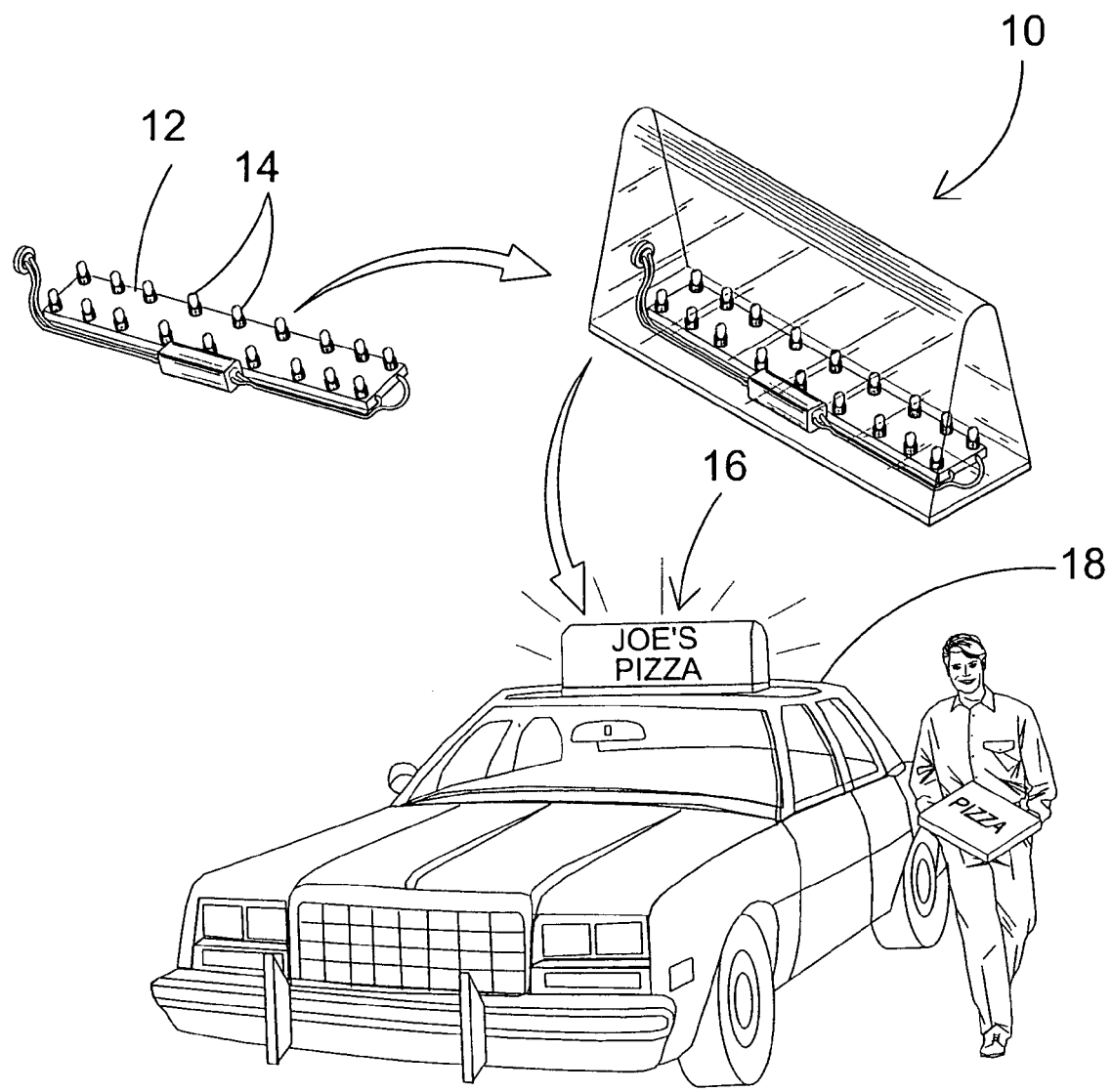
FIG. 1 is an illustrative view of the present invention in use.

With regard to reference numerals used, the following numbering is used throughout the drawings.
- 10 present invention
- 12 board
- 14 light
- 16 advertisement
- 18 roof
- 20 battery pack
- 22 charging port
- 24 wiring
- 26 cover
- 28 plug
- 30 battery charger
- 32 power source
- 34 front of vehicle
- 36 rear of vehicle

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10 disclosing a cordless lighting apparatus having an elongated, planar printed circuit board 12 incorporating a plurality of LED lights 14 connecting a rechargeable battery pack and charging port. The device 10 is designed to receive an advertisement sign 16 and illuminate the sign. The circuit board 12 portion comprises mounting apertures for attachment purposes. The device 10 can be mounted to a vehicle's roof 18 pointing forward and rear or from side to side and can be recharged when needed at the business location using a charger and a standard 110V plug outlet without having to remove the device from the roof of the vehicle.

Figure 2:
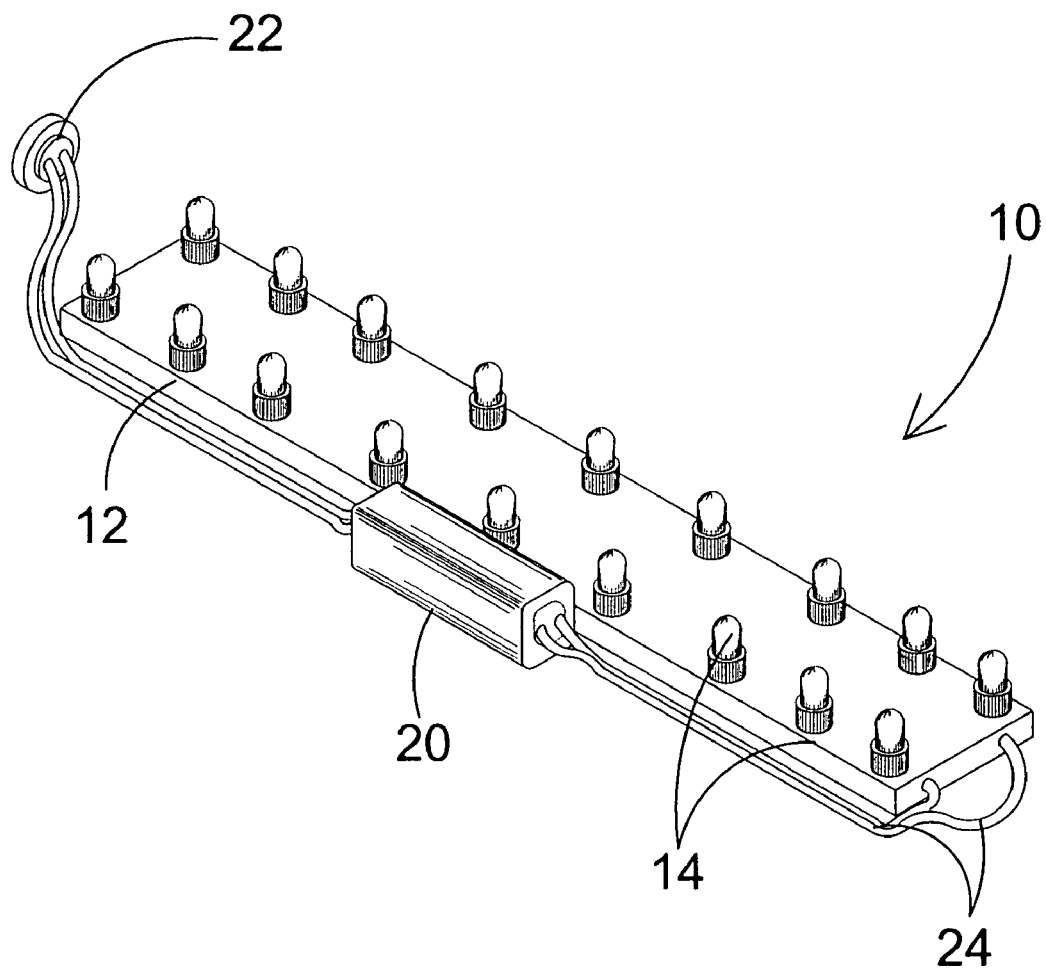
FIG. 2 is a perspective view of the present invention.

Turning to FIG. 2, shown therein is a perspective view of the present invention 10. Shown is the present invention 10 disclosing a cordless lighting apparatus having an elongated, planar printed circuit board 12 incorporating a plurality of LED lights 14 connecting a rechargeable battery pack 20 and charging port 22. The device 10 is designed to receive an advertisement sign and illuminate said sign. The circuit board portion 12 comprises mounting apertures for attachment purposes. The device 10 can be mounted to a vehicle's roof pointing forward and rear or from side to side and can be recharged when needed at the business location using a charger and a standard 110V plug outlet without having to remove the device from the roof of the vehicle. Also shown is electrical wiring 24.

Figure 3:
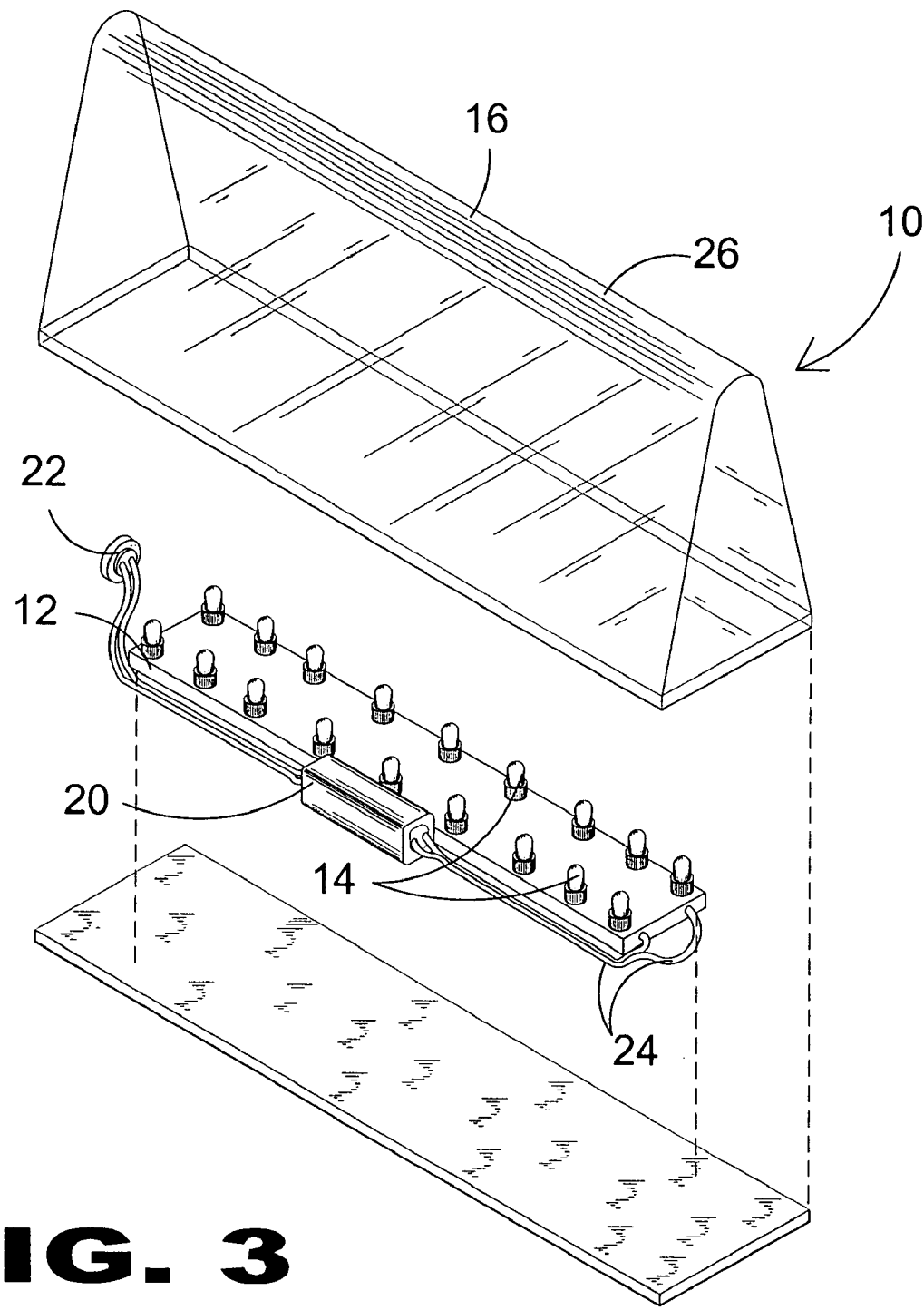
FIG. 3 is an exploded view of the present invention.

Turning to FIG. 3, shown therein is an exploded view of the present invention 10. Shown is the present invention 10 disclosing a cordless lighting apparatus having an elongated, planar printed circuit board 12 incorporating a plurality of LED lights 14 connecting a rechargeable battery pack 20 and charging port 22. The device 10 is designed to receive a cover 26 and an advertisement sign 16 and illuminate the sign. The circuit board portion 12 comprises mounting apertures for attachment purposes. The device 10 can be mounted to a vehicle's roof pointing forward and rear or from side to side and can be recharged when needed at the business location using a charger and a standard 110V plug outlet without having to remove the device from the roof of the vehicle. Also shown is wiring 24.

Figure 4:
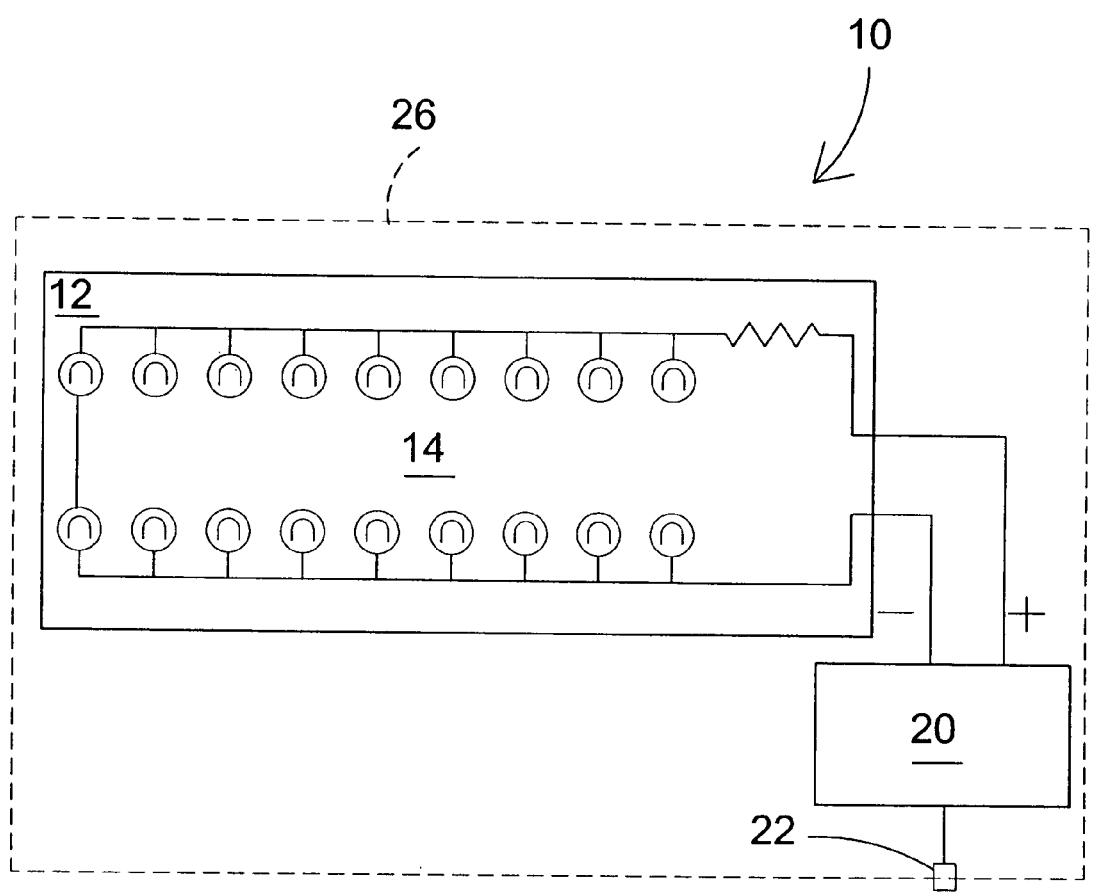
FIG. 4 is a flow chart of the present invention.

Turning to FIG. 4, shown therein is a flow chart of the present invention 10. Shown is a schematic diagram of the present invention 10 disclosing a cordless lighting apparatus having an elongated, planar printed circuit board 12 incorporating a plurality of LED lights 14 connecting a rechargeable battery pack 20 and charging port 22. The device 10 is designed to receive an advertisement sign and illuminate said sign. The circuit board portion 12 comprises mounting apertures for attachment purposes. The device 10 can be mounted to a vehicle's roof pointing forward and rear or from side to side and can be recharged when needed at the business' location using a charger and a standard 110V plug outlet without having to remove the device from the roof of the vehicle. A cover or housing 26 is also shown.

Figure 5:
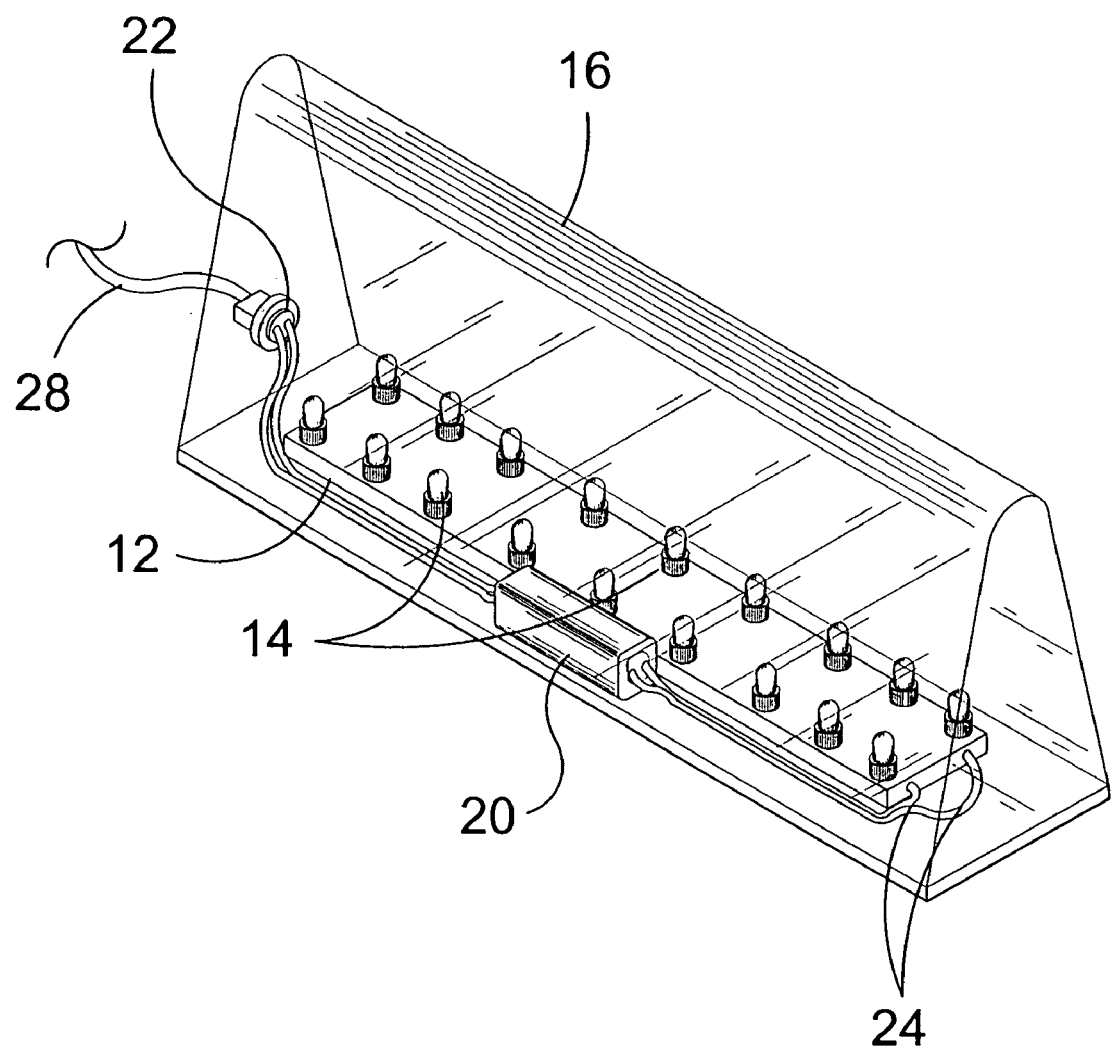
FIG. 5 is a perspective view of the present invention fully assembled.

Turning to FIG. 5, shown therein is a perspective view of the present invention fully assembled. Shown is the present invention 10 disclosing a cordless lighting apparatus having an elongated, planar printed circuit board 12 incorporating a plurality of LED lights 14 connecting with wiring 24 a rechargeable battery pack 20 and charging port 22. The device 10 is designed to receive an advertisement sign 16 and illuminate the sign. The circuit board portion 12 comprises mounting apertures for attachment purposes. The device 10 can be mounted to a vehicle's roof pointing forward and rear or from side to side and can be recharged when needed at the business' location using a charger and a standard 110V plug 28 outlet without having to remove the device from the roof of the vehicle.

Figure 6:
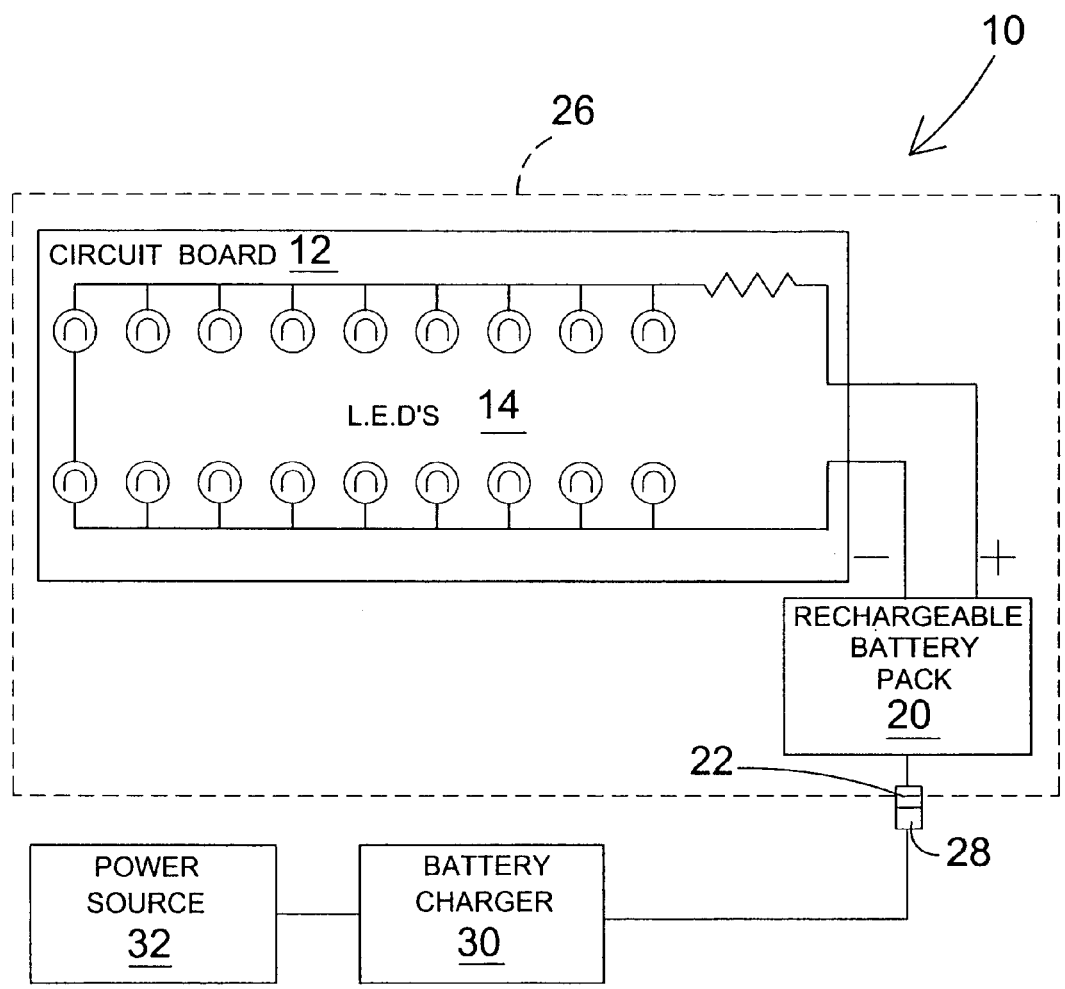
FIG. 6 is a flow chart of the present invention being recharged.

Turning to FIG. 6, shown therein is a flow chart of the present invention being recharged. Shown is a flow chart or diagram of the present invention 10 disclosing a cordless lighting apparatus having an elongated, planar printed circuit board 12 incorporating a plurality of LED lights 14 connecting a rechargeable battery pack 20 and charging port 22. The device 10 is designed to receive a housing 26 with an advertisement sign and illuminate the sign. The circuit board portion comprises mounting apertures for attachment purposes. The device 10 can be mounted to a vehicle's roof pointing forward and rear or from side to side and can be recharged when needed at the business location using a charger 30 connected to a power source 32 and a standard 110V plug 28 outlet without having to remove the device from the roof of the vehicle.

Figure 7:
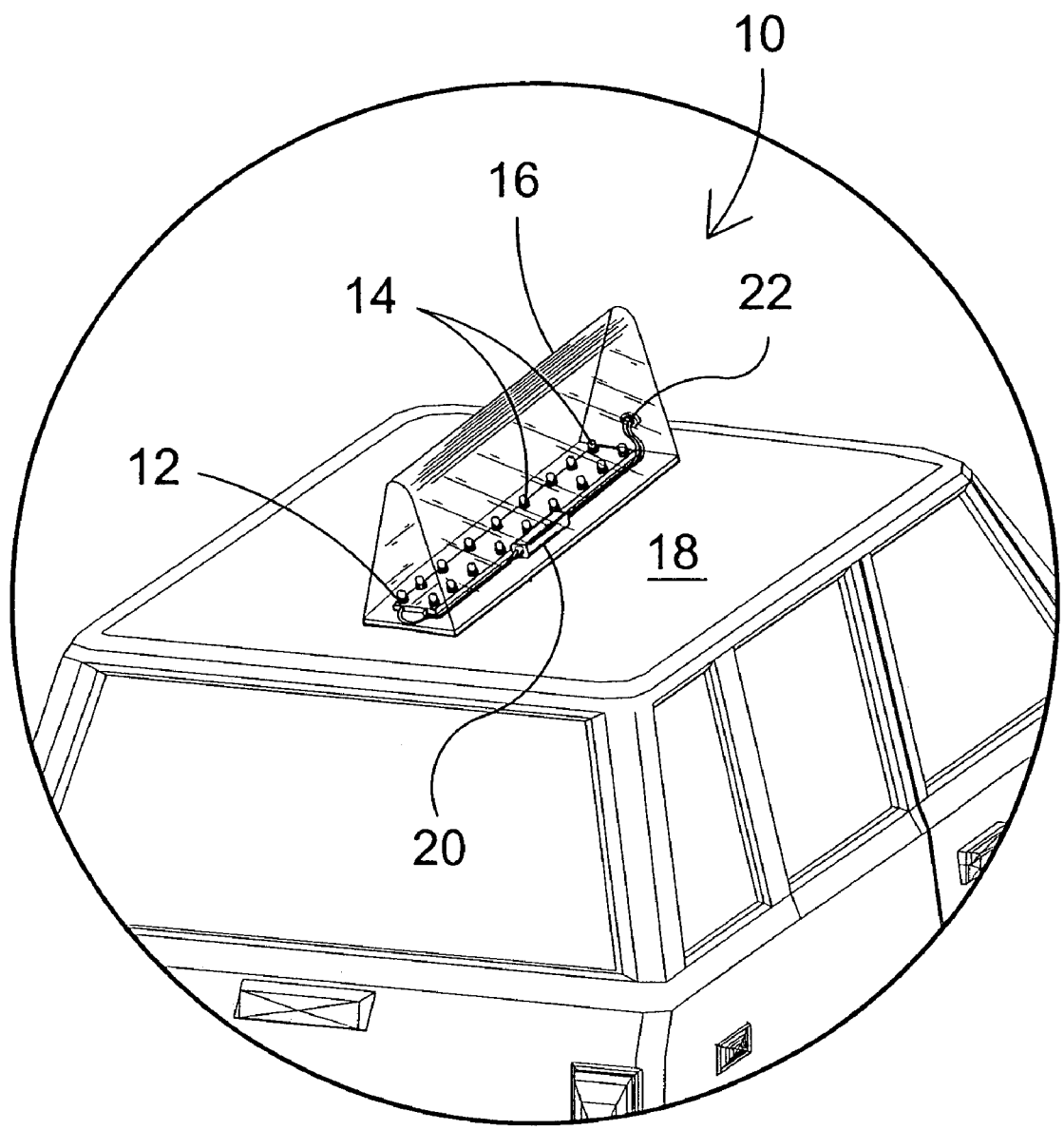
FIG. 7 is an illustrative view of the present invention mounted to a vehicle's roof facing forward and rear.

Turning to FIG. 7, shown therein is an illustrative view of the present invention 10 mounted to a vehicle's roof 18 facing forward and rear. Shown is the present invention 10 disclosing a cordless lighting apparatus having an elongated, planar printed circuit board 12 incorporating a plurality of LED lights 14 connecting to a rechargeable battery pack 20 and charging port 22. The device 10 is designed to receive an advertisement sign 16 and illuminate the sign. The circuit board portion 12 comprises mounting apertures for attachment purposes. The device 12 can be mounted to a vehicle's roof 18 pointing forward and rear or from side to side and can be recharged when needed at the business' location using a charger and a standard 110V plug outlet without having to remove the device from the roof of the vehicle.

Figure 8:
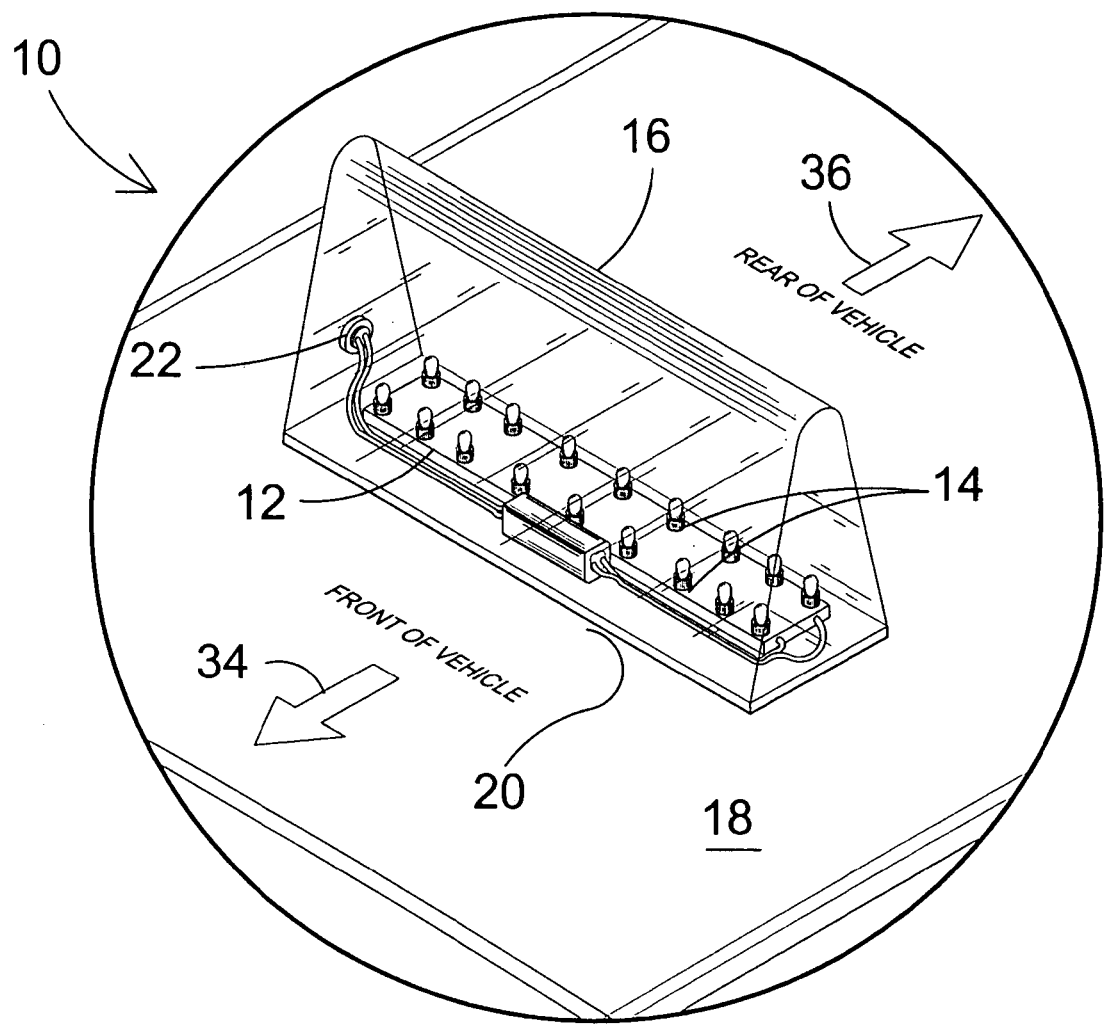
FIG. 8 is an illustrative view of the present invention mounted to a vehicle's roof facing side to side.

Turning to FIG. 8, shown therein is an illustrative view of the present invention 10 mounted to a vehicle's roof 18 facing side to side. Shown is the present invention 10 disclosing a cordless lighting apparatus having an elongated, planar printed circuit board 12 incorporating a plurality of LED lights 14 connecting a rechargeable battery pack 20 and charging port 22. The device 10 is designed to receive an advertisement sign 16 and illuminate the sign. The circuit board portion 12 comprises mounting apertures for attachment purposes. The device 10 can be mounted to a vehicle's roof 18 pointing forward 34 and rear 36 or from side to side and can be recharged when needed at the business location using a charger and a standard 110V plug outlet without having to remove the device from the roof of the vehicle.

What is claimed to be new and desired to be protected by Letters Patent is set forth in the appended claims.

I claim:

1. An apparatus for illuminating an advertising sign for use on a vehicle, comprising:
   a) a circuit board being disposed on the vehicle;
   b) a plurality of lights connected to said circuit board for illuminating the advertising sign;
   c) means for receiving and applying a potential to said circuit board and said lights whereby the circuit board and lights can be powered;
   d) a cover being disposed on said circuit board for covering the apparatus, the cover having at least one transparent surface for displaying the advertising sign when said lights are on, wherein said means for receiving and applying a potential to said circuit board and said lights comprises a battery and said means for receiving and applying a potential to said circuit board and said lights comprises a rechargeable battery; and
   e) a charging port being disposed on said cover, wherein said rechargeable battery can be connected to a battery charger by connection to said charging port.

2. The apparatus of claim 1, wherein said charging port further comprises a standard, two-prong plug wherein said charging port is connected to said battery charger using said plug.

3. The apparatus of claim 2, wherein said circuit board is an elongated, planar board.

4. The apparatus of claim 3, wherein said cover is complementarily shaped as said circuit board.

5. The apparatus of claim 4, wherein said lights comprise light emitting diodes.

6. The apparatus of claim 5, wherein said lights are disposed on said circuit board.

7. The apparatus of claim 6, wherein the vehicle has a roof, wherein said circuit board is disposed on the roof of the vehicle.

8. The apparatus of claim 7, wherein the advertising sign is disposed toward the front of the vehicle.

9. The apparatus of claim 8, wherein the advertising sign is disposed toward the rear of the vehicle.

10. The apparatus of claim 9, wherein the advertising sign is disposed toward a side of the vehicle.

* * * * *